United States Patent Office 3,495,630
Patented Feb. 17, 1970

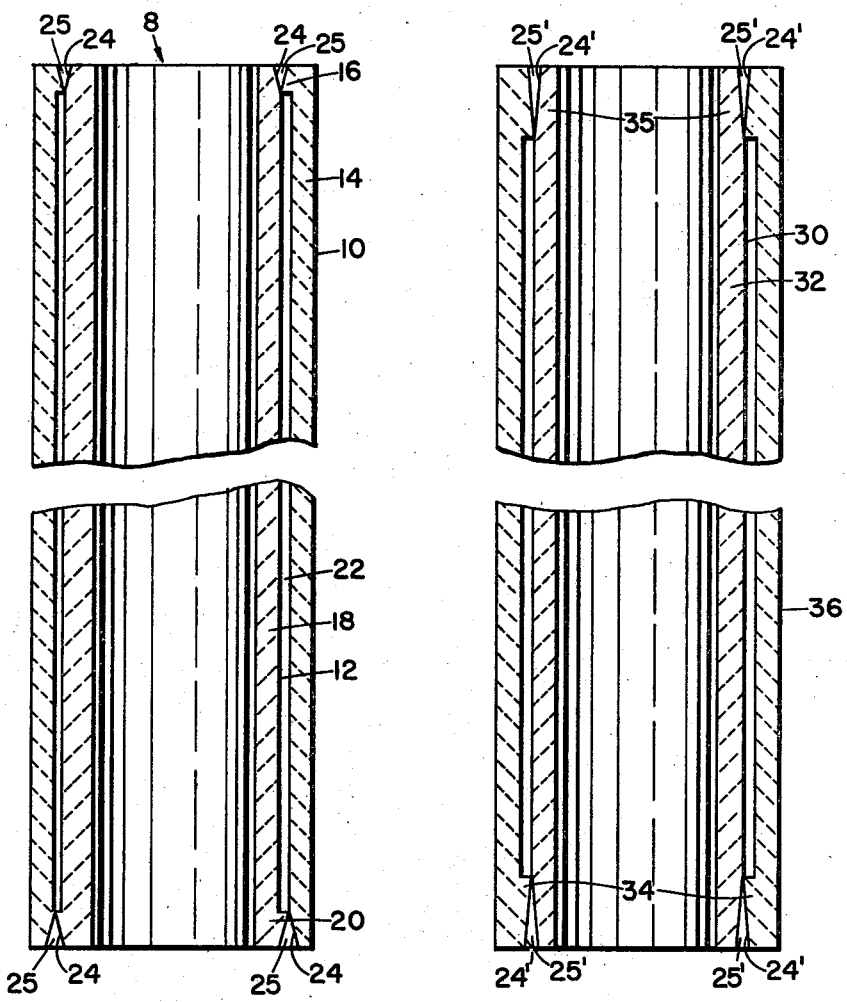

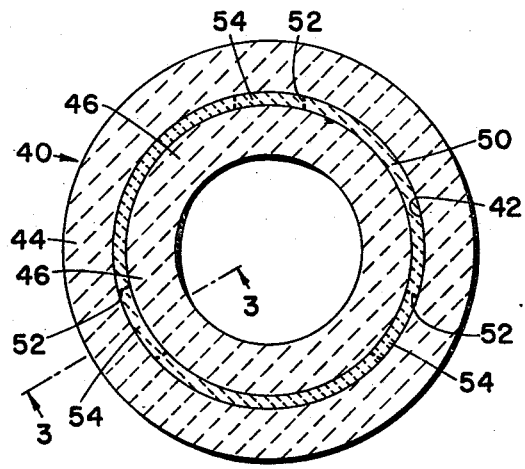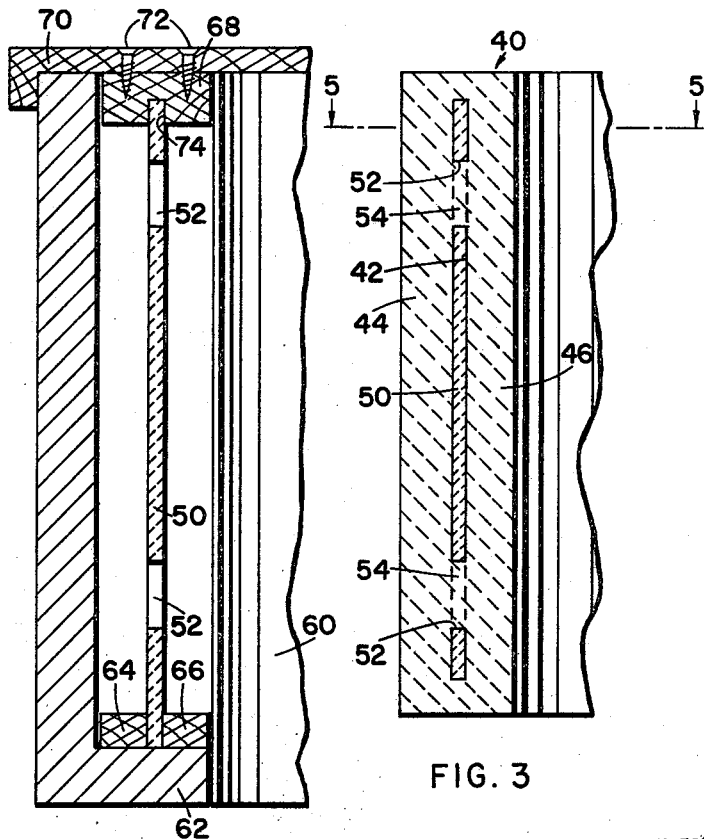

3,495,630
COMPOSITE TUBES
George R. Hansen, Nixon, and Ralph A. Anderson, Perth Amboy, N.J., assignors to The Carborundum Company, Niagara Falls, N.Y., a corporation of Delaware
Filed Mar. 1, 1967, Ser. No. 619,650
Int. Cl. F16l 9/10, 9/18
U.S. Cl. 138—149                                                1 Claim

ABSTRACT OF THE DISCLOSURE

A composite refractory tube having an inner and an outer tube concentrically arranged and joined together at their ends. An annular space is located between the walls of said inner and outer tubes, which space may be left void or filled with a refractory filler material for controlling the thermal gradient of the cross section of said composite tube.

---

This invention relates to refractory bodies and more particularly to composite refractory tubes or shapes for use in the pressure pouring of molten metal.

Refractory tubes and shapes employed in systems for pouring or teeming molten metals having extremely high melting temperatures should have excellent corrosion, erosion and thermal shock resistance. The unitary tubes and shapes now generally used are often unsatisfactory because either they have poor resistance to corrosion and erosion or they are unable to withstand extreme thermal shock. Accordingly, failures occur frequently resulting in costly and time-consuming replacements.

In the present invention, a composite or two-piece refractory tube has been provided to permit the incorporation of all three of the above-mentioned desirable features and eliminating the disadvantages and difficulties attendant to the use of a tube having a unitary construction.

Accordingly, it is an object of the present invention to provide a new and improved refractory tube.

It is another object of the present invention to provide a new and improved composite refractory tube.

It is a further object of the present invention to provide a new and improved composite refractory tube having excellent resistance to corrosion and erosion.

It is yet another object of the present invention to provide a new and improved composite refractory tube having a high resistance to thermal shock.

It is still a further object of the present invention to provide a new and improved composite refractory tube having means for controlling the thermal gradient of the cross section of said tube.

These and other objects and advantages of the present invention will become more apparent upon consideration of the following detailed description when taken in conjunction with the following drawings, in which:

FIG. 1 is an axial sectional view of a composite refractory tube constructed in accordance with the principles of this invention;

FIG. 2 is an axial sectional view of another embodiment of a composite refractory tube constructed in accordance with the principles of this invention;

FIG. 3 is a fragmentary axial sectional view illustrating a further embodiment of a composite refractory tube;

FIG. 4 is a view of the composite refractory tube shown in FIG. 3 illustrating the molding apparatus for casting said tube; and FIG. 5 is a cross sectional view taken on the plane of line 5—5 of FIG. 3 illustrating the entire cross section of the tube.

Referring to FIG. 1 of the drawings, it will be observed that a composite refractory tube generally designated 8 and constructed in accordance with the principles of this invention, comprises an outer section or tube 10 and an inner section or tube 12. Outer tube 10 comprises a cylindrical wall 14 having an annular flange 16 adjacent the top thereof and extending radially inwardly from the wall 14 and integrally connected thereto. The terms top and bottom are referenced to FIG. 1 and, as used herein, are applied only for convenience of description and should not be taken as limiting the scope of this invention.

The inner section 12 comprises a cylindrical wall 18 having an annular flange 20 adjacent the bottom thereof extending radially outwardly of wall 18 and integrally connected thereto. It will be seen that the outer peripheral surface of wall 18 adjacent the top thereof abuttingly engages the inner annular surface of flange 16 and the outer peripheral surface of flange 20 abuttingly engages the inner surface of wall 14 adjacent the bottom thereof to form an annular space 22 between walls 14 and 18.

Sections 10 and 12 are formed of a heat resistant refractory material consisting of mixes that preferably contain mullite, alumina and some clay. Other mixes that can be used may contain fused alumina-zirconia or silicon nitride bonded silicon carbide, as desired. The sections may be individually cast or molded and assembled before firing with a similar mix composition to seal the upper and lower end portions together, or alternatively, if desired, the sections may be separately fired and subsequently assembled by using a suitable refractory cement mix to join the end portions. Moreover, the sections may be composed of different mix compositions in which event inner and outer sections 12 and 10 are provided with diverging portions extending axially outwardly from the connected portions of the tubes defining notches 24 of V-shaped cross section at the juncture of sections 10 and 12 on the top and bottom surfaces, respectively, to provide relief for thermal expansion in the cemented joints. A suitable refractory cement 25 may be deposited in said notches 24.

For the purpose of controlling the thermal gradient of the cross section of composite tube 8, space 22 may be left void or be filled with a suitable refractory filler material such as bulk ceramic fiber, alumina bubbles or the like, which filler material may be placed in the space either before or after firing, as desired. It should also be appreciated that a plurality of the above-described composite tubes may be connected serially to form a conduit by forming lap joints at either end of said tubes.

FIG. 2 illustrates another embodiment of the composite refractory tube of this invention which is similar in all respects to the first-described embodiment above with the exception that the inner section or tube 30 has a cylindrical wall 32 which is uniform in cross section throughout the entire length of said section and has a portion of the outer peripheral surface at each end thereof suitably joined to the radially inwardly extending annular flanges 34 and 35 of the outer section 36.

A third embodiment of the composite refractory tube of this invention is shown in FIGS. 3–5 and comprises a cylindrical shell or wall, generally designated 40, having an annular space 42 disposed substantially midway of wall 40 and extending substantially the length of said tube to form an outer section 44 and an inner section 46. A sleeve 50, made of a suitable refractory material such as bulk ceramic fiber, by way of example, is positioned in annular space 42 to form a resilient refractory annulus.

Spaced inwardly from both ends of sleeve 50 and spaced circumferentially about said sleeve at approximately 120 degrees apart are a plurality of openings 52 for accommodating connecting ribs 54 to provide a stronger bond between sections 44 and 46 and prevent the separation of said sections. Although preferably three openings 52 are employed adjacent the top and bottom, respectively, of the body 40 and circumferentially spaced equally therearound as shown in FIG. 5, it should be realized that the principles of this invention contemplate the use of any suitable number of these openings arranged in any suitable pattern, as desired.

FIG. 4 illustrates the manner in which the composite refractory tube of FIG. 3 is formed. A core 60 of a suitable plaster material is inserted in a mold 62 composed of a similar material. A pair of laterally spaced circular molding baseboards 64 and 66 are placed in the bottom of the mold to receive the sleeve 50 therebetween. Thereafter, a plurality of positioning blocks 68, each having a length equal to the thickness of wall 40 and a relatively thin width are positioned adjacent the top of the refractory annulus 50 and are secured to an upper molding board 70 by means of screws 72. Each positioning block is provided with a slot 74 cut into the underside of the block and disposed substantially midway of the length of said block for receiving the top of sleeve 50 and maintaining the same properly oriented. Although three sets of blocks spaced approximately 120 degrees apart are preferable, it should be realized that the principles of this invention envisage the use of more or less than three blocks, spaced at any desirable interval. FIG. 4 shows the mold with sleeve 50 positioned therein just prior to the casting operation.

A suitable refractory material, consisting of mixes similar to that disclosed in connection with the first embodiment described, is poured into the top of the mold and agitated to cause the mix to compact and flow into intimate contact with the walls of the mold and to fill the openings 52 to form the connecting ribs 54. After the mix has hardened slightly, the upper molding board 70 and positioning blocks 68 are removed from the mold and the voids created thereby are filled with the refractory mix. When the mix has hardened sufficiently, the cast composite tube is removed from the mold and a portion of the sleeve 50 is cut inwardly from the bottom end of wall 40 and the resulting circular slot formed is filled with the mix to produce the finished cast piece shown in FIG. 3.

As a result of the present invention, a new and improved composite refractory tube is provided for handling molten materials in an improved and more efficient manner. By the provision of a two-section tube consisting of an inner tube section disposed within an outer tube section, the composite refractory tube of the present invention is capable of withstanding extreme thermal shock. By the provision of an annular space between the tube sections, the inner tube may expand independently of the outer tube and in the event of a crack occurring in the inner tube, the outer tube remains intact to maintain pressure in the system. The annular space may be left void or filled with a suitable refractory filler material for the purpose of controlling the thermal gradient between the inner and outer tube sections.

Preferred embodiments of the principles of this invention having been hereinabove described and illustrated, it is to be realized that modifications thereof may be made without departing from the broad spirit and scope of this invention.

We claim:

1. A composite tube comprising: an elongated inner tube formed of a heat resistant refractory material and having an exterior surface; an elongated outer tube formed of a heat resistant refractory material and having an interior surface; a portion of said outer tube being spaced radially from a portion of said exterior surface of said inner tube; said iner and outer tubes being joined together adjacent their ends, respectively; said inner and outer tubes being circular in cross section and concentrically arranged; a sleeve formed of ceramic fiber disposed in the space defined by said exterior and interior surfaces of said inner and outer tubes, respectively; said sleeve having a plurality of openings; and a plurality of ribs located in said openings and connecting said inner and outer tubes.

References Cited

UNITED STATES PATENTS

| 1,969,374 | 8/1934 | Kleffel | 138—149 |
| 2,468,902 | 5/1949 | Villiger | 138—114 |
| 3,044,499 | 7/1962 | Frerich | 138—149 |
| 3,155,117 | 11/1964 | Spillman | 138—149 |

FOREIGN PATENTS

| 571,890 | 9/1945 | Great Britain. |
| 775,931 | 10/1934 | France. |

HERBERT F. ROSS, Primary Examiner

U.S. Cl. X.R.

138—113, 148